July 13, 1926.

M. J. GRADY 1,592,099

COMBINED SEAT AND BED FOR VEHICLES

Filed Sept. 24, 1923   2 Sheets-Sheet 1

Inventor
Michael J. Grady
By Hiram A. Sturges
Attorney

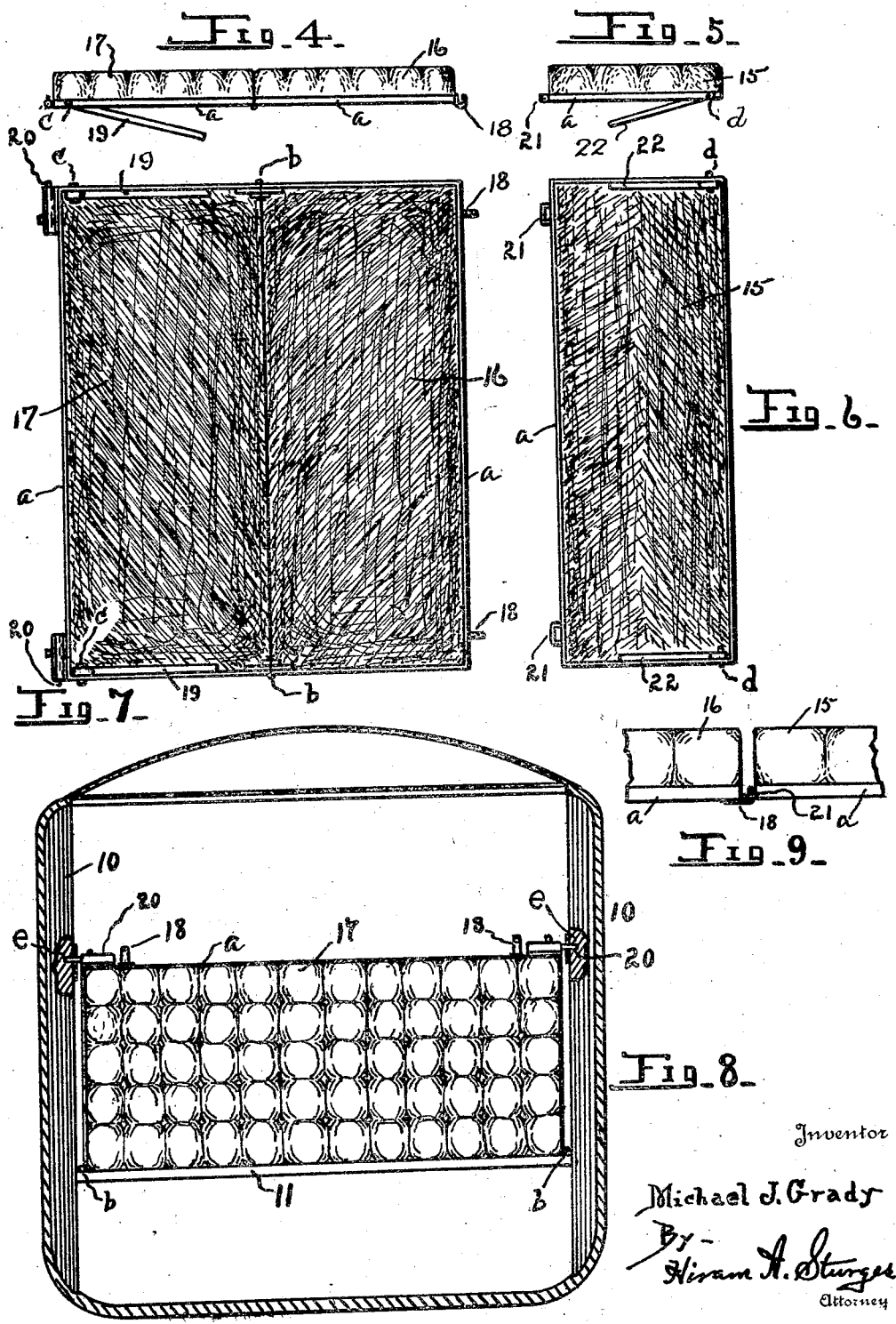

Patented July 13, 1926.

1,592,099

UNITED STATES PATENT OFFICE.

MICHAEL J. GRADY, OF OMAHA, NEBRASKA.

COMBINED SEAT AND BED FOR VEHICLES.

Application filed September 24, 1923. Serial No. 664,381.

This invention has for its object to provide cushions of such construction for an automobile or similar vehicle that they may be used as seats when driving, or may be arranged as a bed, the device being particularly adapted for the use of tourists, or to be used upon camping excursions.

The invention consists of the novel and useful construction, combination and arrangement of parts as described herein and claimed, and as illustrated in the accompanying drawing, it being understood that changes in form, size, proportion of parts and minor details may be made, as found to be of advantage, said changes being determined by the scope of the invention as claimed.

Figure 1:
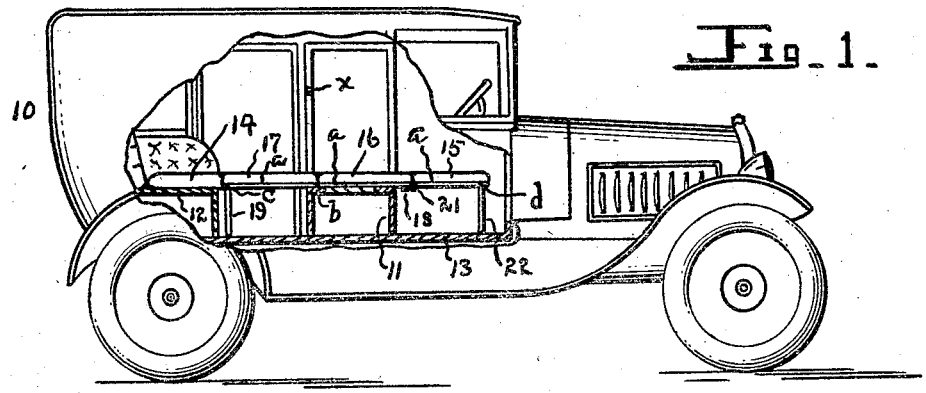
Figure 2:
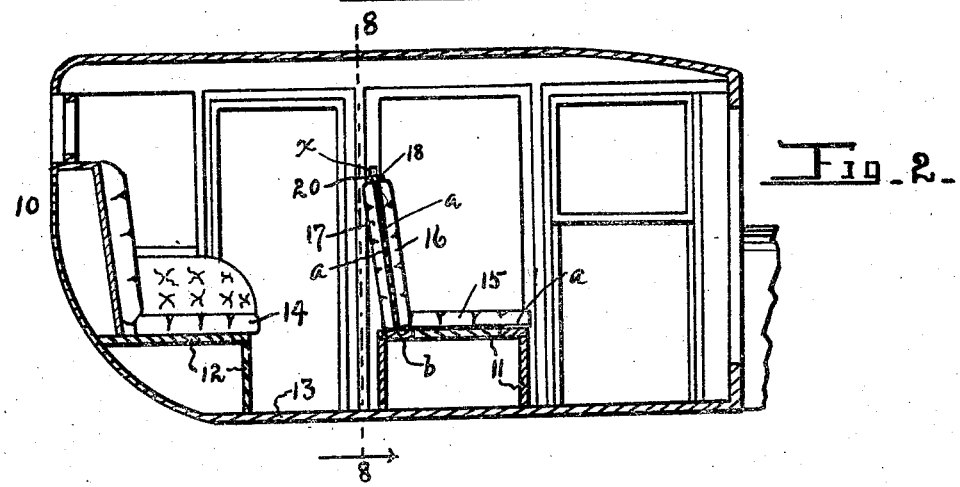
Figure 3:
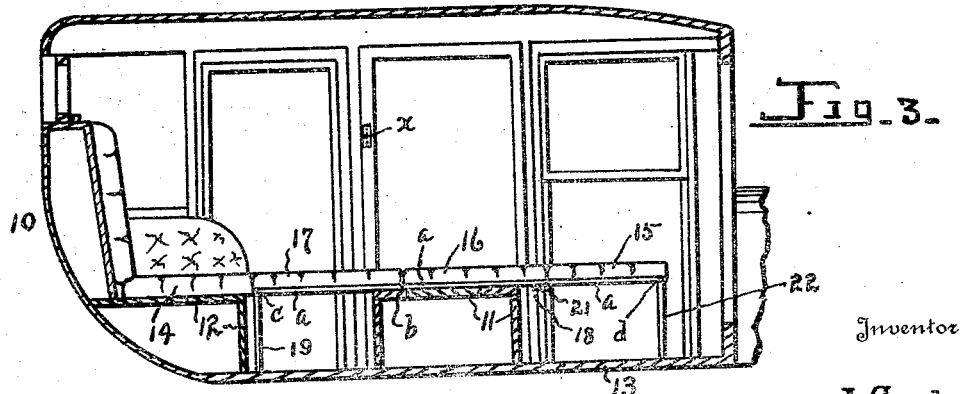

In the drawing, Fig. 1 is a side view, partly broken, of an automobile with cushions arranged as a bed. Fig. 2 illustrates a vehicle body in longitudinal section, showing the cushions arranged as a seat. Fig. 3 is a view similar to that shown in Fig. 2, the cushions being arranged as a bed. Fig. 4 is an end view of a pair of connected cushions adapted to be folded and used as a back for a seat, or to be arranged as a part of a bed. Fig. 5 is an end view of a cushion adapted to be used as a front seat, or as an extension for a bed. Fig. 6 is a bottom plan view of the cushion shown in Fig. 5. Fig. 7 is a bottom plan view of the pivotally connected cushions shown in Fig. 4. Fig. 8 is a transverse section on line 8—8 of Fig. 2. Fig. 9 is a broken away view showing a removable connection for two adjacently disposed cushions.

Referring now to the drawing for a more particular description, the invention is shown and described in connection with certain stationary parts of a vehicle body 10, as the box or compartment 11 generally employed in automobile construction for supporting a front seat, the box or frame 12 which supports a rear seat, and the floor 13. The invention is also described in connection with the cushion 14 for the rear seat.

In order that the object first mentioned may be attained I have shown cushions indicated respectively at 15, 16 and 17, each consisting of a yielding body provided with a frame $a$, thin, metallic strips preferably being employed for the frames, these being disposed at or near the lower parts and circumscribing the cushions and secured thereto by any suitable means, the upper parts of the cushions being comparatively remote from the frames or strips so that the normal, soft, yielding condition of the cushions will not be lessened by the presence of said strips.

The cushions 16 and 17 are pivotally connected at their ends, as indicated at $b$. Numerals 18 indicate hoops which are provided for the outer side of the cushion 16. Numerals 19 indicate legs which are provided for the cushion 17, these being pivotally mounted as indicated at $c$ upon and disposed at the inner side of the frame; and at 20 are indicated a pair of catches or slide-bolts, each being secured to the frame of a cushion 17, at the end and outer side thereof, adjacent to a leg 19.

The cushion 15 is provided with staples 21, these being secured to the frame $a$ of said cushion, at the side thereof, and at 22 are indicated legs, these being pivotally mounted, as indicated at $d$, upon the frame, and disposed at the inner side thereof, opposite to the staples 21.

As thus described it will be seen that the cushions 15, 16 and 17 may be arranged to provide a bed, the cushion 16 being supported by the compartment 11, as best shown in Fig. 3, one end of the cushion 17 resting on the top of said compartment, its legs 19 being swung downwardly to the floor 13, the staples of the extension-cushion receiving the hooks 18 of the cushion 16, and its legs 22 being swung downwardly to the floor support.

The cushions thus described may be used in conjunction with the cushion 14 of the rear seat, and the bed thus provided may be readily and conveniently arranged, the device being of great advantage for tourists since, tents, bedding and excess baggage for sleeping accommodations may be dispensed with.

To arrange the cushions for driving, the cushion 15 may be released from the hooks 18 and its legs 22 may be swung toward the bottom of the cushion to lie unobtrusively between the frame $a$ and end portions of said cushion. The cushions 16 and 17 may then be folded or collapsed, their bottoms being swung toward each other to form a back, said cushions swinging on the pivots $b$, so that the metallic strips or frames will lie midway between the outer, soft, yielding parts of said cushions; and when folded as described these cushions form a back to a seat, and may be placed with their pivotally connected sides upon the support 11, as shown in Figs. 2 and 8, the catches or bolts 20, at the upper side of the cushion 17, engaging in a part of the frame of the vehicle body above the ends of said cushion, as indicated at e in Fig. 8. The cushion 15 may then be placed upon the support 11 in engagement with the cushion 16, for use as the front seat.

While three cushions have been specifically shown and described, I may employ a greater or lesser number as may be required to form a bed by use of the cushions which provide the front seat and its back; also, while I have shown and described metallic strips or frames for the cushions, I may dispense with the use of said frames if desired.

Since the lengths of vehicle bodies are not uniform, and since the distance between the front and rear seats may greatly vary, only two cushions will be required in some instances, the cushion 15 remaining on the seat support 11 and the cushions 16 and 17 being considered a single cushion and adapted to be swung rearwardly from the support 11 to, approximately, a horizontal position, its legs 19 being adapted to engage the floor when the parts are arranged as a bed, and adapted to be swung from the support 11 to an upright position, the bolts 20 engaging in sockets x when the parts are arranged for driving.

I claim as my invention,—

1. In a combined seat and bed for a vehicle body having a floor and a seat-support on the floor, a pair of pivotally connected cushions approximately equal in length and equal in width adapted to be folded and disposed upright on the support to provide a back, a third cushion normally disconnected from said first pair adapted to be disposed horizontally on the support to provide a seat, said pair of pivotally connected cushions being adapted to be swung into alignment and to be disposed horizontally upon the support and to extend beyond the rear and front parts of said support, said third cushion being adapted to be disposed in disengaged relation with the seat support in alignment with and forwardly of said pair of pivotally connected cushions, legs on one of the cushions of said pivotally connected pair for engaging the floor, co-operating fastening devices upon and adapted to removably connect the third cushion with one of the cushions of said pivotally connected pair, and legs on the third cushion for engaging the floor.

2. In a combined seat and bed for an automobile having a seat support, a seat consisting of a yielding body circumscribed by a metallic frame normally engaging the support and having fastening devices, a back consisting of a pair of yielding bodies circumscribed by a pair of upright, hingeably connected, folded, metallic frames normally engaging said support and provided with fastening devices, said back being adapted to be extended to provide parts of a bed, its metallic frames engaging and projecting rearwardly and forwardly of the seat support, said seat being adapted to be disposed in disengaged relation with and forwardly of the seat support with its fastening devices removably secured to the fastening devices of one of the frames of said back, and legs engaging the inner sides of said frames and arranged to swing outwardly therefrom and adapted to be swung inwardly to lie between the yielding bodies and said frames.

In testimony whereof, I have affixed my signature.

MICHAEL J. GRADY.